United States Patent [19]

Houser

[11] 4,272,015
[45] Jun. 9, 1981

[54] COACH CLIMATE CONDITIONING BLOWER CONTROL

[75] Inventor: Raymond E. Houser, Wooster, Ohio

[73] Assignee: Grumman Flexible Corporation, Delaware, Ohio

[21] Appl. No.: 44,005

[22] Filed: May 31, 1979

[51] Int. Cl.³ .......................... F24F 7/00; B60H 3/00
[52] U.S. Cl. ....................................... 236/49; 62/133; 165/43
[58] Field of Search .................... 236/49, 91 F, 1 R; 62/133, 186; 165/23, 43

[56] References Cited

U.S. PATENT DOCUMENTS

| Re. 14,475 | 5/1918 | Troll . | |
|---|---|---|---|
| 1,091,012 | 3/1914 | Pachaly . | |
| 2,774,227 | 12/1956 | Schjolin et al. . | |
| 3,011,718 | 12/1961 | Joerren et al. | 236/49 X |
| 4,114,807 | 9/1978 | Naseck et al. | 165/16 X |

FOREIGN PATENT DOCUMENTS 1530055  6/1970  Fed. Rep. of Germany ............. 165/16

Primary Examiner—William E. Wayner
Attorney, Agent, or Firm—Mellor A. Gill

[57] ABSTRACT

A blower control system for the evaporator blowers employed in the climate conditioning system for a motor vehicle passenger compartment. Maximum blower efficiency for the various conditions of operation is attained by using blowers having two operating speeds, the proper operating speed in this invention being dictated by engine water temperature, outside temperature, passenger loading, and system return air temperature. The passenger load sensing circuit has a pressure switch associated with the suspension springs system of the vehicle for switching the blowers from low to high speed operation when load conditions so dictate. A zero speed controller is used to lock in a blower speed selected when loading or unloading passengers to avoid unwanted repetitive cycling of the system.

2 Claims, 9 Drawing Figures

PASSENGER LOADING
VS.
PNEUMATIC SPRING PRESSURE

LEFT HALF

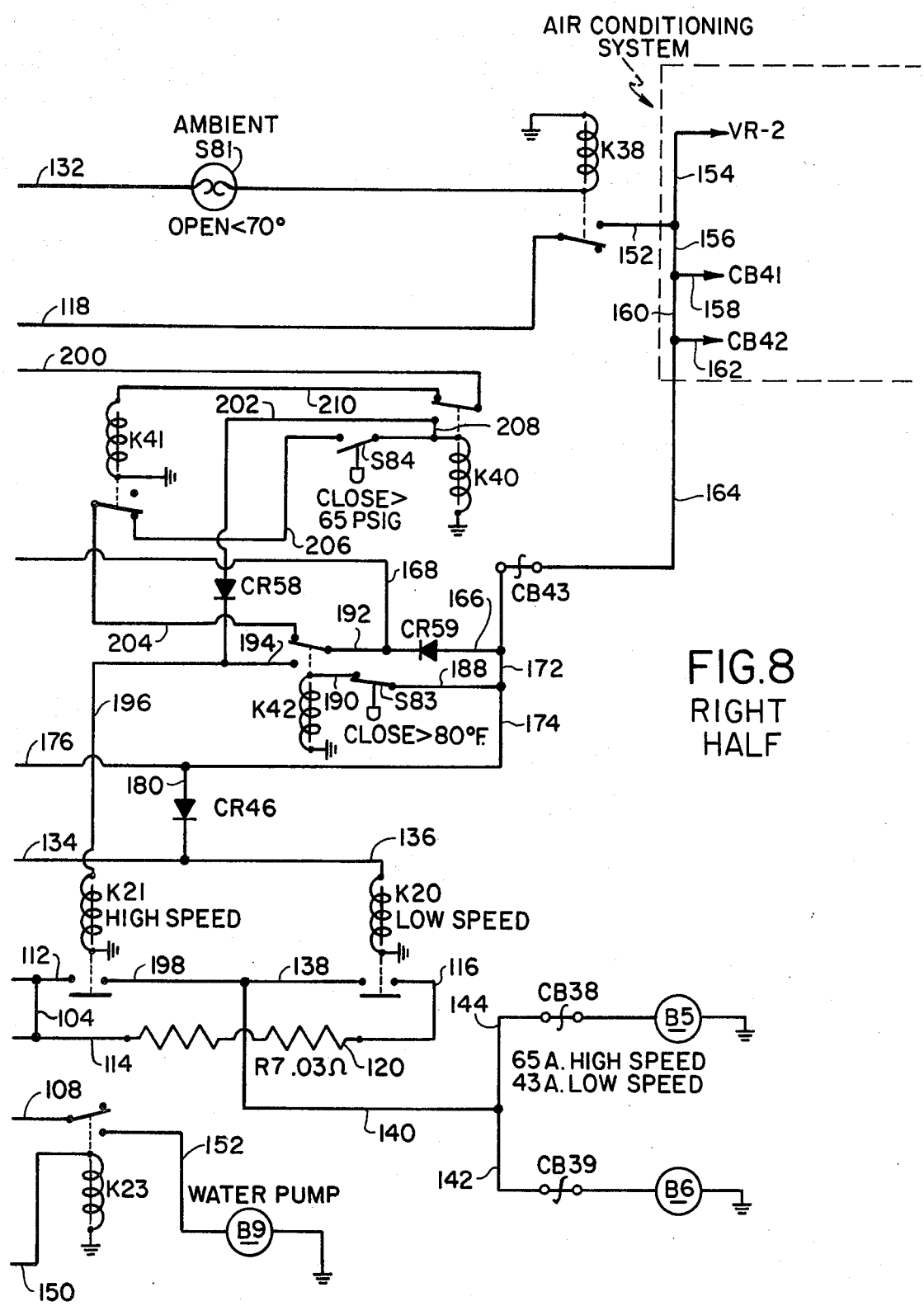
FIG.8 RIGHT HALF

COACH CLIMATE CONDITIONING BLOWER CONTROL

BACKGROUND OF THE INVENTION

1. Field of the Invention

The present invention relates generally to a climate control system for passenger vehicles and, more particularly, to means for controlling the operation of the blower system of a motor vehicle heating, air conditioning, and ventilation system in accordance with outside ambient air temperatures, passenger loading, and the return air temperatures of the system.

2. Description of the Prior Art

Systems for heating, cooling, and ventilating a highway bus, coach, or other passenger vehicle are, of course, well known and it is believed that the apparatus disclosed by E. T. Todd in U.S. Pat. No. 3,008,694 can be considered a representative example of the prior art. It is also known to provide blower control means for passenger buses and the like to regulate the output of the temperature and ventilation control blowers to condition the air in the passenger compartment. Examples of prior teachings of such control means are shown by H. E. Norviel and R. W. Pachaly in U.S. Pat. Nos. 1,941,363, and 1,091,012, respectively, who disclose apparatus for turning on an electric fan automatically to circulate air in the passenger compartment when the vehicle is moving slowly or when it is at a standstill; T. J. Lehane et al., U.S. Pat. No. 2,667,336, who discloses apparatus for conditioning air in a passenger compartment in accordance with the heating and cooling load relative to the capacity of the heating and cooling apparatus; and A. R. Clark, U.S. Pat. No. 3,075,449, who teaches means for controlling the heating and ventilating blower in accordance with the speed of the vehicle and the temperature within the operator's compartment. It will be appreciated; however, that none of the enumerated prior art discloses means by which the blowers of the system are controlled in accordance with ambient temperatures, passenger load, and return air temperature of the system such that the volume and temperature of the air used to comfort-condition the passenger compartment of a vehicle can be regulated precisely and efficiently. It is seen also that F. J. Troll, in U.S. Pat. Nos. 1,147,128 and No. Re 14,475, shows that it is known to sense the load on a motor vehicle, but there is nothing in Troll's disclosures that teach the utilization of the signal produced by his load sensing apparatus to control a blower in a climate conditioning system for the vehicle.

Inasmuch as none of the prior art blower control means for vehicle heating, cooling, and ventilating systems sense outside ambient temperatures, passenger loading, and return air temperatures of the system to deliver air at an optimum temperature and volume to the passenger compartment of the vehicle, it is seen that their efficiency suffers thereby and the present invention offers an improvement over the prior art that meets the exacting standards of the present day passenger vehicles.

SUMMARY OF THE INVENTION

The climate control system in which this invention is used is preferably a full heating system integrated with an air conditioning system using common blowers to circulate conditioned air within a passenger vehicle such as a coach or bus. Coach interior temperature is controlled with a two-stage thermostat which serves to maintain a pre-set temperature by switching "on" or "off" a hot water circulating pump and the hot water valve associated therewith such that the required circulation of hot water to the heating system is established. Stage two of this thermostat maintains the 68° F. or other desired setting for the heating mode. When in this mode, the blowers cannot come on unless the heater water as detected by a thermostat is at 105° F. (or other suitable temperature).

The first stage of the two-stage thermostat maintains the desired 72° F. setting for the air conditioning mode by switching "on" or "off" the hot water pump and associated valve such that the heating system is provided with the required circulation of hot water necessary to maintain the desired temperature.

The blower control system of this invention employs evaporator blowers having two operating speed ranges to assure the delivery of the required volume of air for all conditions to the passenger compartment of the coach. The proper operating speed range of the blowers is dictated by outside ambient temperature, passenger loading, and system return air temperature, the passenger load sensing circuit being in the form of a pressure switch connected to the rear pneumatic springs for switching the blower from low speed to high speed operation when load and temperature conditions so indicate. In addition, a zero speed controller is used when the vehicle starts to move after a stop to take on or discharge passengers to lock in the last blower speed dictated by the passenger load in order to avoid repetitive cycling.

Normal operation of the blowers is at low speed until the air entering through the return grill exceeds some preset temperature such as about 26° C. (80° F.) (nominal); and/or passenger loading exceeds some predetermined number such as approximately 70 people. When these conditions are fulfilled, the blowers switch automatically to high speed for maximum air volume delivery. These functions respectively are controlled principally by a temperature sensor located behind the return air grill and by a pressure switch connected to the curbside rear pneumatic spring.

It thus is a principal object of the invention to provide an automatic control of the blowers of the climate conditioning system of a passenger vehicle to afford automatically the proper volume of air through the system to insure the maximum comfort of the passengers.

A further object of the invention is to provide a two-speed blower for the climate conditioning control system of the passenger compartment of a motor vehicle and automatic blower-control means associated therewith which control means use outside ambient temperature, passenger load, and return air temperature as control parameters to supply conditioning air at the proper temperature and volume for optimum passenger comfort.

Another object of the invention is to provide blower control means for a vehicle passenger compartment which senses the passenger load and which has means operative after the vehicle has been at a standstill for loading and unloading to lock the blowers into the speed determined by the number of passengers aboard such that unnecessary repetitive cycling of the control means and blowers is avoided.

Still another object of the invention is to accomplish the foregoing in a practical, inexpensive, and reliable manner.

Other and further objects of the invention will be obvious upon an understanding of the illustrative embodiment about to be described, or will be indicated in the appended claims, and various advantages not referred to herein will occur to one skilled in the art upon employment of the invention in practice.

DESCRIPTION OF THE DRAWINGS

For the purpose of illustrating the invention, there is shown in the drawings the form which is presently preferred; it should be understood, however, that the invention is not necessarily limited to the precise arrangements and instrumentalities shown.

DESCRIPTION OF THE PREFERRED EMBODIMENT

Figure 1:
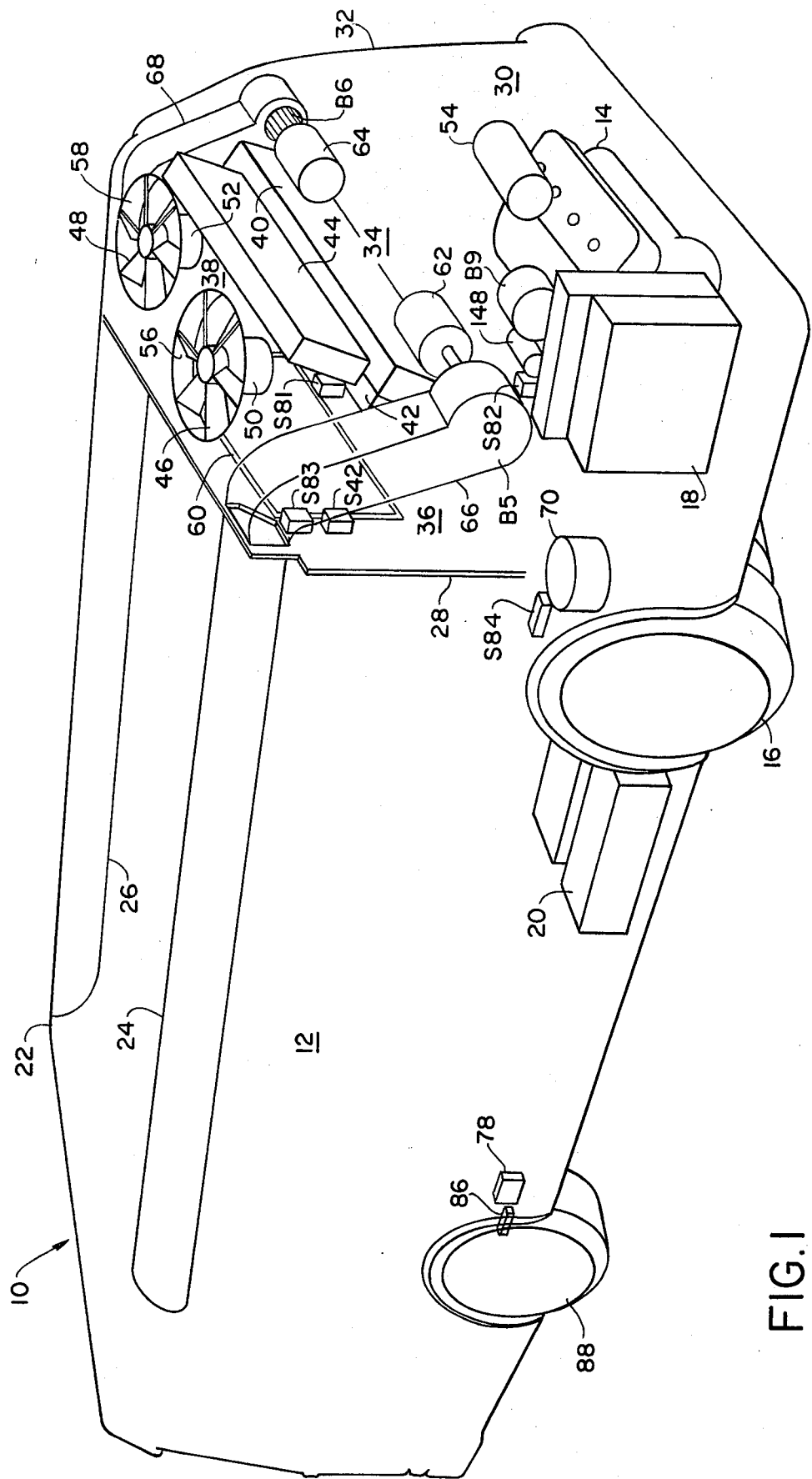
FIG. 1 is a schematic representation of a passenger vehicle viewed from the rear quarter showing the relationship with one another of the various elements embodied in the invention.

Referring now to the drawings, particularly to FIG. 1, reference numeral 10 generally designates a vehicle, in this case a bus or coach of usual construction having a passenger compartment 12. The passenger compartment is provided with the usual doors, windows, seats, operator's station, and the like (not shown). Propulsion of the coach is by means of a conventional rear-mounted engine 14 which supplies power to the rear wheels 16 through known conventional means. The engine is provided with a radiator 18, storage batteries 20, and the usual ancillary equipment required for the operation thereof. Underlying the roof 22 of the coach is a false ceiling, a longitudinal portion of which on each side is formed into air distribution ducts 24 and 26 extending from the forward part of the coach to the wall 28 of the engine compartment 30 at the rear end 32 of the vehicle. It will be appreciated that wall 28 forms the rear wall of the passenger compartment 12. Disposed over the engine compartment are a blower compartment or plenum 34, an evaporator plenum 36, and a condenser plenum 38, these plenums having therein the heater coils 40, the evaporator coils 42, and the condenser coils 44 which form a part of the heating and air conditioning equipment of the coach. In the interest of clarity, the walls defining the plenums are not shown, but they are to be understood to be of conventional construction for compartments of this type. A pair of condenser fans 46 and 48 driven by motors 50 and 52 deriving their power from an engine-driven alternator 54 are used to cool the condenser coils. Air drawn in through inlets 56 and 58 by the fans passes through the condenser coils and is discharged through an openwork grill (not shown) in the rear 32 of the vehicle. A pair of return air grills (only one 60 of which is shown) in rear wall 28 admit coach interior air into the evaporator plenum 36 where it is mixed with an amount, preferably a minimum of 20%, of ambient exterior air entering from a grill (not shown) in the rear of the vehicle. This air mixture is suitably filtered and passes the air cooling evaporator coils 42, the air heating heater coils 40 and into the blower plenum 34. Here the mixture is pressurized by blowers B5 and B6, which are driven by motors 62 and 64, and is discharged through blower ducts 66 and 68 into ducts 24 and 26 for distribution into the passenger compartment 12 of the coach. Motors 62 and 64 are of the direct current type having a low and a high speed range, the speed range being a function of the voltage applied on the motors. The ducts 24 and 26 are provided with suitable louvers or perforations arranged in a well-known manner such that the desired circulation of conditioned air into the passenger compartment is established.

As is common practice in the art, provision is made in this system to change automatically from the air conditioning and preheat mode to the heating mode. This change-over is controlled by an adjustable thermostat S81 located in the condenser plenum 38. The thermostat S81 is normally adjusted for a set point of 60° F.

Figure 2:
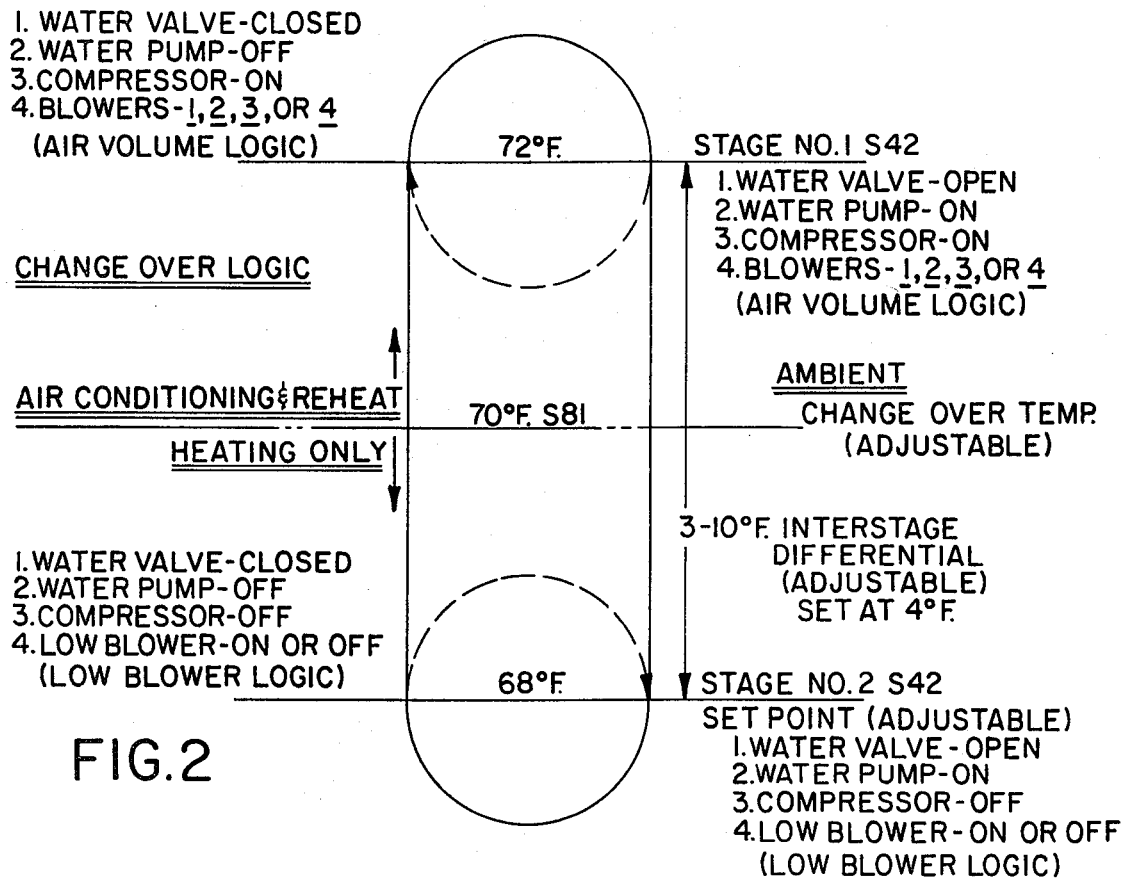
FIGS. 2, 3, and 4 are diagrams of the logic employed in various phases of operation of the blowers and associated elements embodied in the invention.

The temperature within the passenger compartment of the coach is maintained at a desired level by a two-stage dual-switching, single-element thermostat S42 located behind the return air grill 60. Operation of thermostat S42 is in accordance with the logic diagrammed in FIG. 2. One section, or stage 1, of the thermostat controls the air conditioning and heating mode at a preferred adjustable set point and the other section, or stage 2, controls the heating mode in a preferred adjustable differential below the initial set point. Normal set point of this thermostat is 70° F. with a 6° differential.

Figure 3:
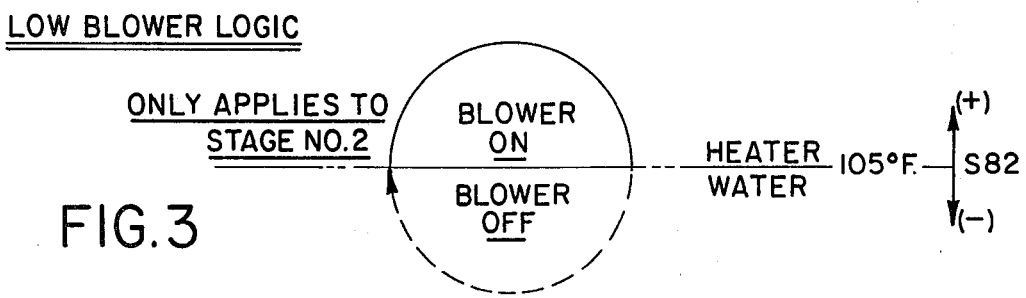
Figure 4:
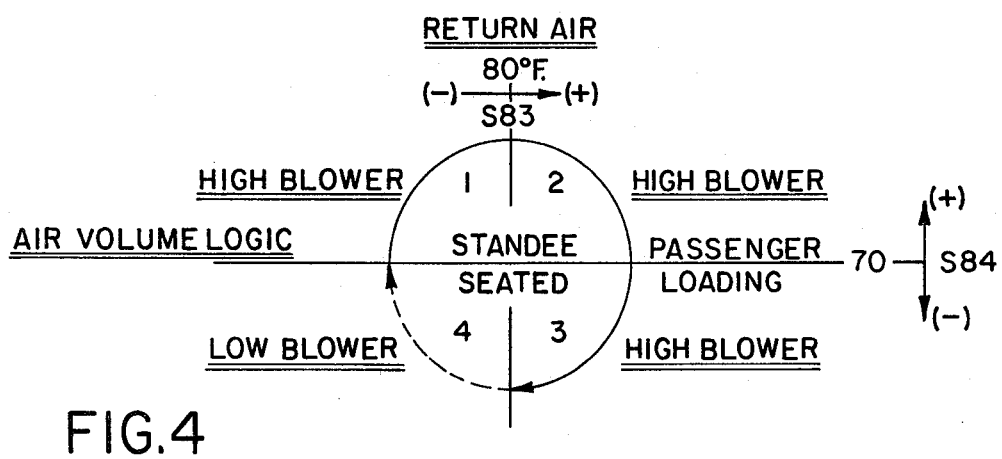
Figure 5:
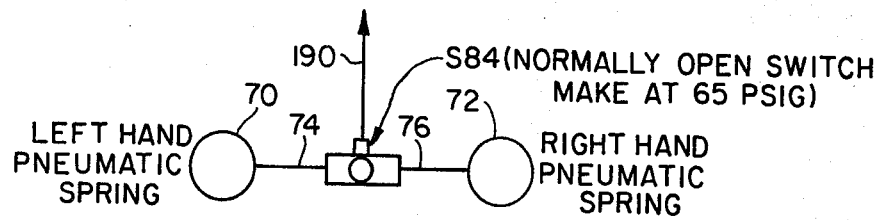
FIG. 5 is a schematic diagram of passenger load sensing means embodied in the invention.
Figure 6:
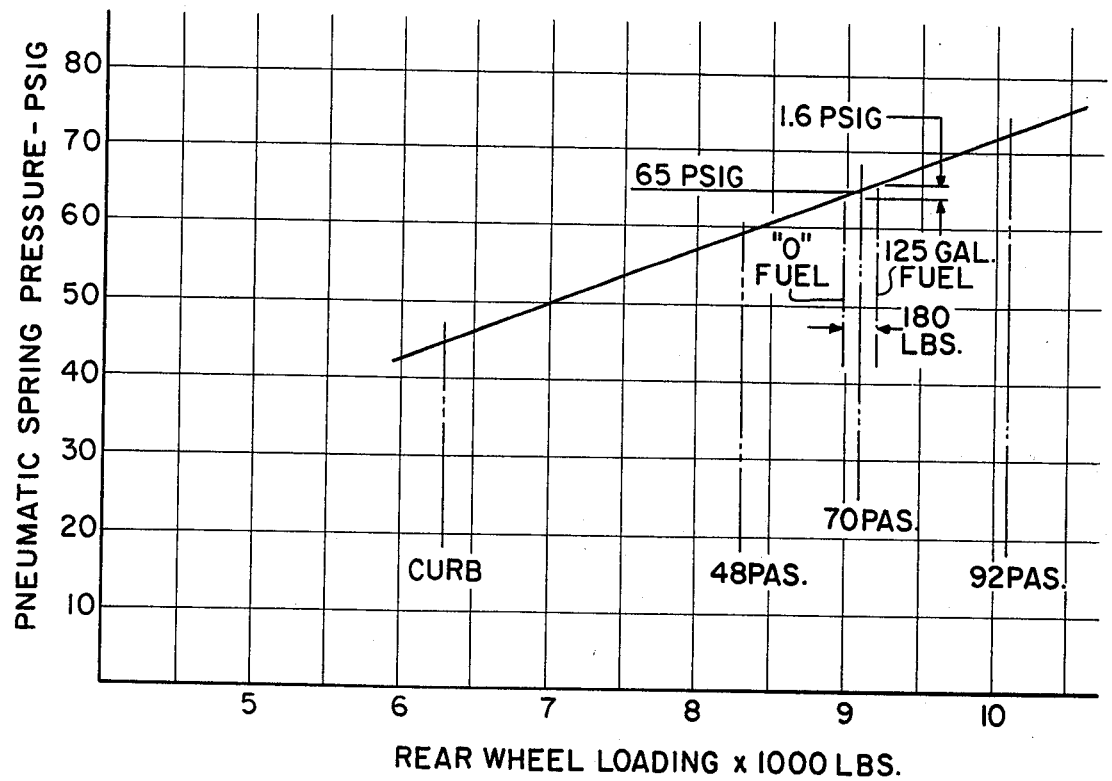
FIG. 6 is a graph of the operational characteristics of the passenger load sensing means embodied in the invention.

Air is circulated through the passenger compartment of the coach by blowers B5 and B6, the operation of which is controlled either by a thermostat S83 located behind the return air grill 60 or by a pressure switch S84 operatively associated with the rear pneumatic springs 70 and 72 of the vehicle. In addition, the blowers are further controlled by a thermostat S82 which senses engine water temperatures. When the engine 14 is running, thermostat S82 is tripped when water temperature reaches 105° F. to thereby cause the blowers B5 and B6 to run in their low speed range (see the logic diagram in FIG. 3). In operation in the air conditioning mode, the blowers normally operate at low speed until either the air entering the return grill 60 as sensed by thermostat S83 exceeds 80° F. (nominal) or passenger loading as sensed by pressure switch S84 exceeds approximately 70 passengers. When those conditions are sensed, the blowers are switched automatically to high speed for the delivery of a maximum volume of air (see the logic diagram in FIG. 4). Pressue switch S84 is connected to the rear pneumatic springs 70 and 72 in an operative relationship therewith by means of pneumatic lines 74 and 76 (FIG. 5) and the electrical output of the switch passes to the control circuitry of the blowers through line 190. Normal set point of pressure switch S84 is 65 psig. FIG. 6 illustrates the relationship of pneumatic spring pressure with the passenger and vehicle fuel loading. It will be appreciated, of course, that if the vehicle has a suspension system of a type other than the pneumatic type, an appropriate sensor such as a pressure transducer can be coupled to the spring means used to furnish a signal indicative of passenger load.

To prevent "hunting" of the control system due to pressure excursions when the vehicle is moving, a zero speed controller 78 is incorporated into the system to disable electrically the pressure switch S84 when the vehicle is under way. Referring to the circuit diagram of FIG. 7, the zero speed controller circuit has a Motorola Electronic Speedometer connected into it at 80 and 82 and a 12 V input is provided at 84. The electronic speedometer is excited by a pencil sensor 86 with a 120-tooth rotor on the hub of the left front wheel 88 of the coach (See FIG. 1). A suitable pencil sensor is available commercially from Rockwell International Electronics. An enable line connected to the controller circuit at 90 requires a 12 V signal from the closed door circuit (not shown) of the coach to get an output at 92. With this controller circuit, there will not be an output at 92 at any condition below a predetermined sensed wheel speed. When above the sensed speed, which preferably is an angular displacement of the vehicle wheel 88 of 1-inch per second and, providing that an enable signal from the closed door circuit is received, there will be a 12 V output at 92 which will lock blowers B5 and B6 into the speed selected when the vehicle was at a stop.

Figure 8:
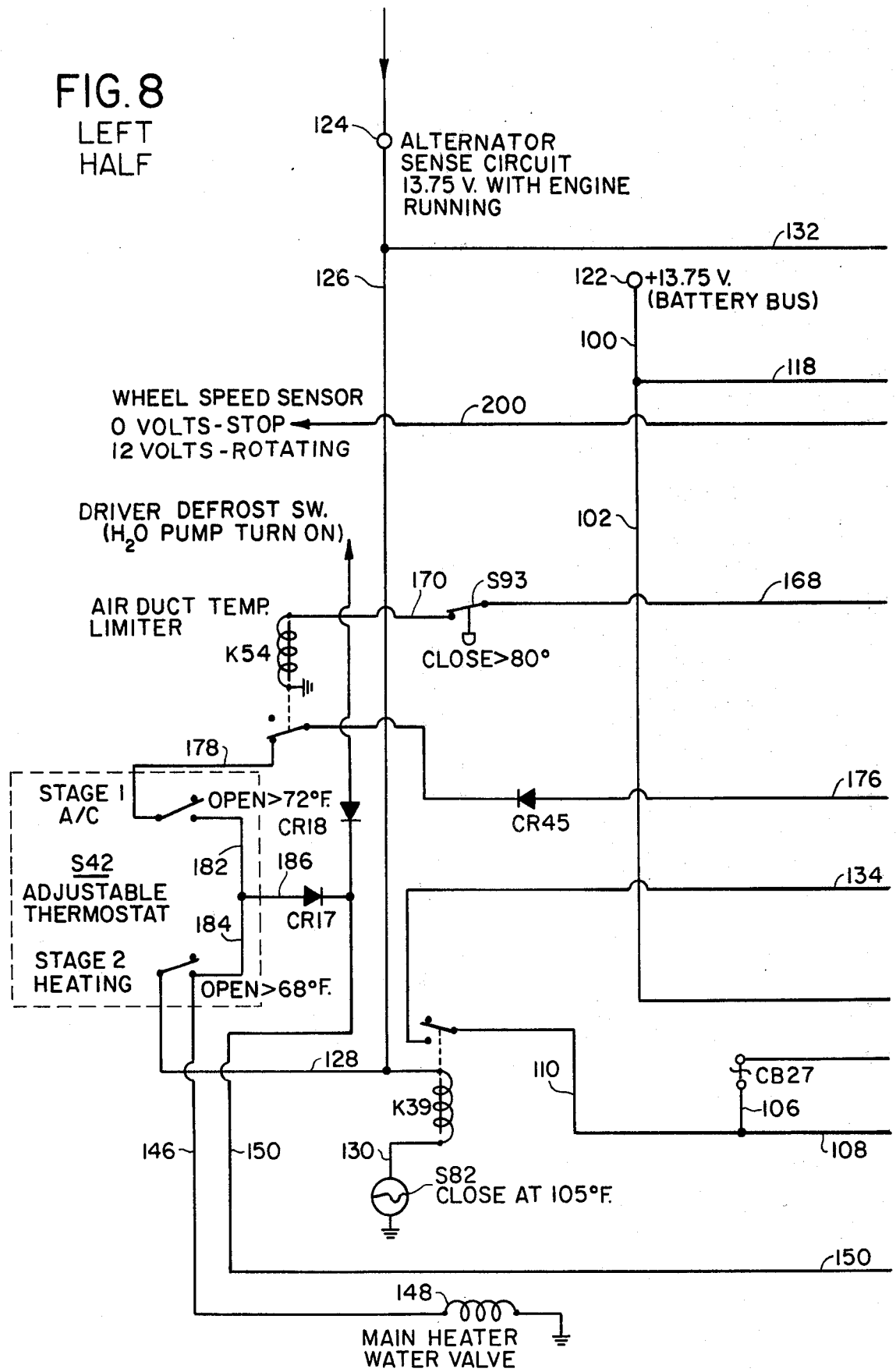
FIG. 8 is a circuit diagram of a climate control system of a passenger vehicle embodying the blower control means of the invention.

The blower speed control of this invention is an element of the heating and air conditioning system comprising the climate control system of the coach 10 the electrical circuit diagram of which is shown in FIG. 8. With reference now to the FIG. 8 diagram, when the engine 14 of the vehicle is not running, although lines 100-118 and resistor 120 connected to the battery bus 122 will be live, there will not be a current flow because relays K20, K21, K23, K38, and K39 will be open as shown.

The same conditions prevail when the engine is running, with the difference that the alternator sense circuit 124 will be producing a 13.75 V output on lines 126-132. When engine water temperature is below 105° F., thermostatic switch S82 will be open. When water temperature rises above 105° F., switch S82 will close, which action closes relay K39, and the consequent current flow through lines 100-106, 110, 134, and 136 will cause relay K20 to close and current from the battery bus 122 will flow through lines 100, 102, 104, and 114, the resistor 120, line 116 and lines 138-144 to run blowers B5 and B6 at their low speed.

If, during the low blower operation just described, the interior temperature of the passenger compartment is below 68° F., stage 2 of the thermostat S42 will close and power will flow from the alternator 124 through the closed contact of thermostat S42 and thence through line 146 to thereby open the water valve 148 of the main heater (not shown). At the same time, current will flow through line 150 to trip relay K23, which action permits current to flow through line 152 to activate the water pump B9. The pump circulates hot water through the coils 40 of the heater, heating the air passing therethrough for delivery by blowers B5 and B6 into the passenger compartment 12 to raise the temperature therein to the temperature called for by thermostat S42.

Should ambient temperature rise above 70° F., thermostatic switch S81 will close, closing relay K38 such that current will flow from the battery bus 122 through lines 100, 118 and 152-162 to turn on the air conditioning system. Under these conditions, current will also flow through lines 164, 172, 174, and 136, causing relay K20 to close and current from battery bus 122 will flow through lines 100, 102, 104, and 114, the resistor 120, line 116 and lines 138-144 to run blowers B5 and B6 at their low speed. It will be appreciated that when the passenger compartment temperature rises above 70° F., stage 2 of thermostat S42 will open; however, stage 1 of the thermostat will be closed and current through lines 182, 184, and 146 will keep the main heater water valve 148 open and current through lines 186 and 150 will keep relay K23 closed such that the water pump B9 will continue to circulate hot water through the main heater as required.

Should the passenger compartment temperature as sensed by the thermostat S83 at the return air grill 60 rise above 80° F., that thermostat will close and current through lines 188 and 190 will trip relay K42. This action sets up a current flow through lines 166 and 192-196, closing relay K21. Current will thus flow through lines 100, 102, 112, 198, and 140-144 to thereby run blowers B5 and B6 at high speed, furnishing the maximum volume of air to the passenger compartment of the coach.

Under conditions with the air conditioning system operating, a passenger load of over 70 people, and the coach at a stop, pressure switch S84 will be closed. This action sets up a current flow through lines 166, 192, 204-208, 202, and 196, and will cause relay K21 to close and current from battery bus 122 will flow through lines 100, 102, 112, 198, and 140-144 to run blowers B5 and B6 at their high speed. With the coach stopped, there will not be a voltage output from the wheel speed sensor 78 to affect the operating conditions dictated by the other control elements. However, when the vehicle begins to move, the 12 V output from the controller 78 passes through line 200 sealing relay K40 closed to retain relay K21 in the closed position thereby locking blowers B5 and B6 in their high-speed range.

Under conditions with air conditioning system operating, a passenger load of less than 70 people, and the coach at a stop, pressure switch S84 will be open. When the vehicle beings to move, the 12 volt output from controller 78 passes through line 200 and 210 energizing relay K41, which disconnects line 206 from pressure switch S84, making it inoperative, thereby retaining flowers B5 and B6 in their low speed range.

In the air conditioning mode, heating (or reheat) is controlled by stage 1 of thermostat S42. Air distribution duct temperature in this mode is normally 55° F. Should the 72° F. set point of thermostat S42 be approached, the heating system cuts in with a consequent rise in duct temperature, in some instances, faster than the thermal response of the thermostat S42. When the duct temperature reaches 80° F., a thermostat S93 located in a blower intake closes, energizing relay K54, to open the connection between lines 176 and 178, thus terminating reheat.

Figure 7:
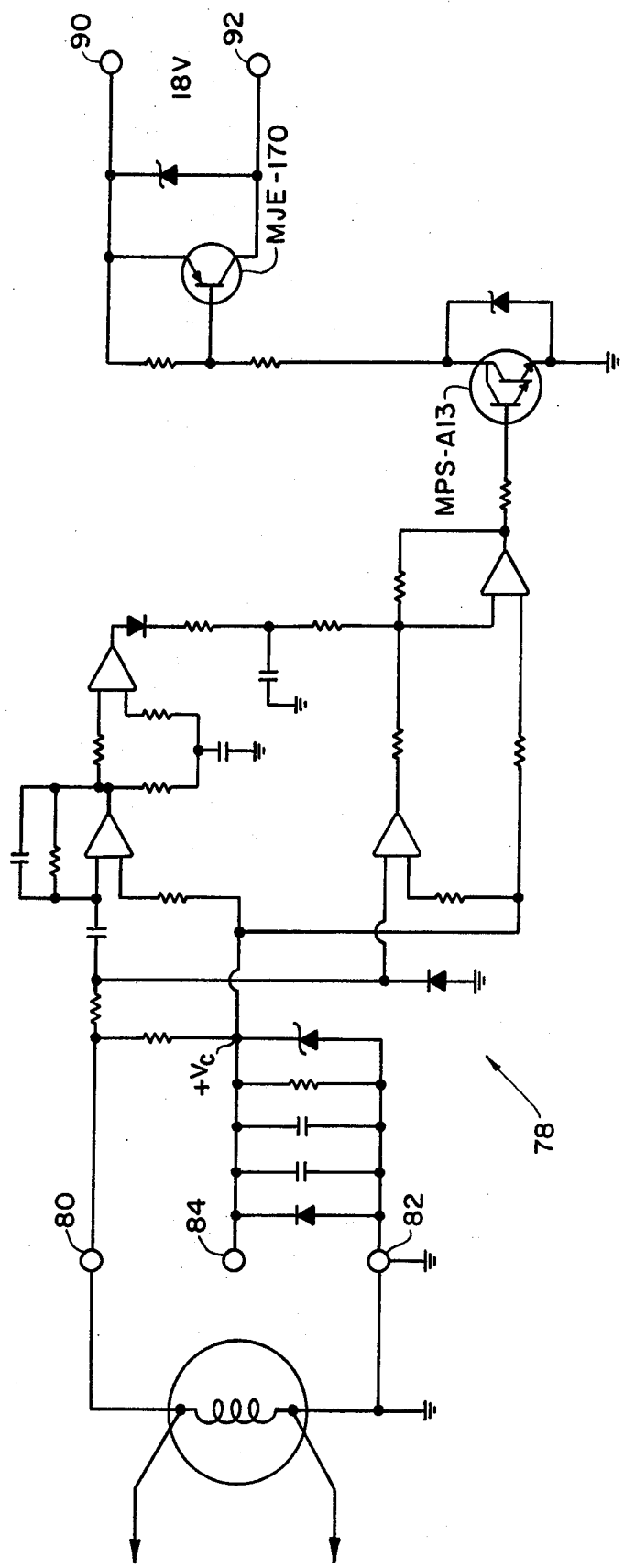
FIG. 7 is a circuit diagram of speed sensing means embodied in the invention.

It is believed that the above exposition, coupled with the circuit diagrams of FIGS. 7 and 8, convey an understanding of the invention and of the inter-relationship of the various elements thereof. It is also believed that any aspect or detail of the invention not specifically set forth herein will be readily understood in the context of the exposition already made. With respect to the circuit diagrams themselves, the functioning of common circuit components such as circuit breakers, rectifiers, and the like that are shown are not explained as it is believed that such explanation would serve no useful purpose. The same also applies with respect to elements of the air conditioning, reheat, heating, and ventilation systems as the operation thereof are well known and do not differ from systems in common use.

Although shown and described in what are believed to be the most practical and preferred embodiments, it is apparent that departures from the specific methods and apparatus described will suggest themselves to those skilled in the art and may be made without departing from the spirit and scope of the invention. I, therefore, do not wish to restrict myself to the particular instrumentalities illustrated and described, but desire to avail myself of all modifications that may fall within the compass of the appended claims.

Having thus described my invention, what I claim is:

1. In a climate control system for the passenger compartment of a motor vehicle having at least one blower for circulating air through said passenger compartment, an air conditioning, reheating, and heating system for conditioning the air circulated by said blower, an electric motor operable at a low and a high speed driving said blower, and a source of electric power for operating said blower, the improvement in an electrical control circuit for controlling the speed of said blower comprising: switch means in said blower control circuit for selecting automatically the operating speed of said blower, said switch means including a first thermostat responsive to the temperature of the coolant of the engine of said vehicle, a second thermostat responsive to outside ambient temperature, a third thermostat responsive to the temperature of the return air from said passenger compartment, and a pressure switch operatively connected to the suspension system of said vehicle such that said pressure switch is responsive to weight imposed on said vehicle as a function of the number of passengers aboard the same, said thermostats having predetermined temperature set points, said pressure switch having a predetermined pressure set point, said switch means being operable to switch said control circuit to operate said blower at its low speed in a first condition where said first thermostat is above its said set point and said second and third thermostats and said pressure switch are below their said set points and in a second condition where said first and second thermostats are above their said set points and said third thermostat and said pressure switch are below their said set points, and said switch means being operable to switch said control circuit to operate said blower at its high speed in a third condition where said first and second thermostats and said pressure switch are above their said set points and said third thermostat is below its said set point and in a fourth condition where said first, second, and third thermostats are above their said set points and said pressure switch is below its said set point, whereby a correct volume of air for a specified passenger load conditioned to maintain a specified passenger compartment temperature is delivered by said blower.

2. The climate control system defined in claim 1 wherein zero speed controller means operatively associated with a wheel of the vehicle is provided to lock the blower in an operating speed selected by the blower control circuit switch means when said vehicle is at a standstill, said controller means comprising an electronic speedometer which has a sensor element associated with said wheel such that there is an electrical output signal from said speedometer when said sensor reflects rotational movement of said wheel, said output signal disabling electrically the pressure switch in said blower control circuit consequent to vehicle movement resulting from said wheel rotation whereby pressure excursions in the suspension system of said vehicle as a result of said movement do not affect the blower speed selected when said vehicle was at a standstill.

* * * * *